United States Patent
Trotter et al.

(10) Patent No.: US 11,458,406 B2
(45) Date of Patent: Oct. 4, 2022

(54) PROGRESSIVE HUMAN USER DETECTION CHALLENGES WITH REWARDS

(71) Applicant: Electronic Arts Inc., Redwood City, CA (US)

(72) Inventors: Meredith Trotter, San Francisco, CA (US); Reza Pourabolghasem, San Mateo, CA (US); Sundeep Narravula, Saratoga, CA (US); Kazi Atif-Uz Zaman, Foster City, CA (US); Navid Aghdaie, San Jose, CA (US)

(73) Assignee: Electronic Arts Inc., Redwood City, CA (US)

(*) Notice: Subject to any disclaimer, the term of this patent is extended or adjusted under 35 U.S.C. 154(b) by 193 days.

(21) Appl. No.: 16/798,060

(22) Filed: Feb. 21, 2020

(65) Prior Publication Data
US 2021/0260488 A1 Aug. 26, 2021

(51) Int. Cl.
*A63F 13/79* (2014.01)
*G06F 21/31* (2013.01)

(52) U.S. Cl.
CPC .............. *A63F 13/79* (2014.09); *G06F 21/31* (2013.01); *G06F 2221/2103* (2013.01); *G06F 2221/2133* (2013.01)

(58) Field of Classification Search
CPC .. A63F 13/79; G06F 21/31; G06F 2221/2103; G06F 2221/2133
See application file for complete search history.

(56) References Cited

U.S. PATENT DOCUMENTS

| | | | |
|---|---|---|---|
| 8,316,310 B2* | 11/2012 | Champion | G06F 21/316 |
| | | | 715/757 |
| 9,105,034 B2* | 8/2015 | Hamilton, II | G06Q 30/02 |
| 9,452,355 B1* | 9/2016 | Lin | A63F 13/53 |
| 10,152,585 B2* | 12/2018 | Bhosale | G06F 21/32 |
| 10,318,978 B2* | 6/2019 | Hamilton, II | G06Q 30/0217 |
| 10,356,073 B2* | 7/2019 | Gonen | G06F 3/14 |
| 10,904,236 B1* | 1/2021 | Walters | H04W 12/06 |
| 2010/0262457 A1* | 10/2010 | House | G06Q 30/0251 |
| | | | 705/7.29 |
| 2012/0246008 A1* | 9/2012 | Hamilton, II | G06Q 30/0241 |
| | | | 705/14.66 |

(Continued)

*Primary Examiner* — William H McCulloch, Jr.
(74) *Attorney, Agent, or Firm* — McDermott Will & Emery LLP (57) ABSTRACT

Various aspects of the subject technology relate to systems, methods, and machine-readable media for granting access to a game. The method includes receiving a request to access the game. The method also includes causing to display a set of challenge options representing challenges of varying difficulty levels for a user to select. The method also includes receiving a selection of a challenge option from a user device. The method also includes causing to present a challenge to the user. The method also includes receiving challenge data from the user including interactions with and results of the challenge. The method also includes determining whether the user passed the challenge based on the challenge data. The method also includes executing or enabling execution of the game upon determining that the user passed the challenge. The method also includes providing the user rewards associated with the game for passing the challenge.

20 Claims, 5 Drawing Sheets

(56) References Cited

U.S. PATENT DOCUMENTS

| | | | |
|---|---|---|---|
| 2014/0058811 A1* | 2/2014 | Gorowitz | G06Q 30/0231 |
| | | | 705/14.12 |
| 2015/0371253 A1* | 12/2015 | Hamilton, II | G06Q 30/0241 |
| | | | 705/14.19 |
| 2021/0139127 A1* | 5/2021 | Walters | B63H 21/21 |
| 2021/0260488 A1* | 8/2021 | Trotter | A63F 13/88 |
| 2021/0379493 A1* | 12/2021 | Harder | G06N 5/003 |

* cited by examiner

PROGRESSIVE HUMAN USER DETECTION CHALLENGES WITH REWARDS

TECHNICAL FIELD

The present disclosure generally relates to video games, and more particularly to progressive human user detection challenges with rewards.

BACKGROUND

In video games, a bot is a type of artificial intelligence (AI)—based expert system software that plays a video game in the place of a human. Bots are problematic because players who use them gain unfair advantages over other players. A CAPTCHA (an acronym for "Completely Automated Public Turing test to tell Computers and Humans Apart") is a type of challenge—response test used in computing to determine whether or not a user is human. CAPTCHAs may be utilized to prevent bots from accessing content intended only for human users.

BRIEF SUMMARY

The subject disclosure provides for systems and methods wherein, instead of a single CAPTCHA (e.g., a human user detection challenge), a user is presented with multiple dynamically-generated puzzles of increasing difficulty. Each puzzle may be each paired with an in-game reward. Any one of the puzzles may be solved to pass the CAPTCHA. Each puzzle may include scrambled parts of the in-game reward, for example, a weapon, a skin, in-game currency, etc., that the player will also receive upon successful completion. Players may choose the simplest option if they wish to get to the game faster, or they can take more time to get a larger reward. Users with more knowledge of the game may also be able to solve the difficult puzzles more quickly, which rewards high engagement players. Long term user behavior (i.e., always choosing the same/easiest option) also may provide additional information as to which users may be a bot.

According to one embodiment of the present disclosure, a computer-implemented method for granting access to a game is provided. The method includes receiving a request to access the game from a user. The method also includes, in response to the request, causing to display a set of challenge options representing challenges of varying difficulty levels for a user to select. The method also includes receiving a selection of a challenge option from a user device associated with the user. The method also includes, in response to the selection, causing to present a challenge to the user. The method also includes receiving challenge data from the user including one or more of interactions with the challenge and results of the challenge. The method also includes determining whether the user passed the challenge based on the challenge data. The method also includes executing or enabling execution of the game upon determining that the user passed the challenge. The method also includes providing the user one or more rewards for passing the challenge, the rewards being associated with the game.

According to one embodiment of the present disclosure, a system is provided including a processor and a memory comprising instructions stored thereon, which when executed by the processor, causes the processor to perform a method for granting access to a game. The method includes receiving a request to access the game from a user. The method also includes, in response to the request, causing to display a set of challenge options representing challenges of varying difficulty levels for a user to select. The method also includes receiving a selection of a challenge option from a user device associated with the user. The method also includes, in response to the selection, causing to present a challenge to the user. The method also includes receiving challenge data from the user including one or more of interactions with the challenge and results of the challenge. The method also includes determining whether the user passed the challenge based on the challenge data. The method also includes executing or enabling execution of the game upon determining that the user passed the challenge. The method also includes providing the user one or more rewards for passing the challenge, the rewards being associated with the game.

According to one embodiment of the present disclosure, a non-transitory computer-readable storage medium is provided including instructions (e.g., stored sequences of instructions) that, when executed by a processor, cause the processor to perform a method for granting access to a game. The method includes receiving a request to access the game from a user. The method also includes, in response to the request, causing to display a set of challenge options representing challenges of varying difficulty levels for a user to select. The method also includes receiving a selection of a challenge option from a user device associated with the user. The method also includes, in response to the selection, causing to present a challenge to the user. The method also includes receiving challenge data from the user including one or more of interactions with the challenge and results of the challenge. The method also includes determining whether the user passed the challenge based on the challenge data. The method also includes executing or enabling execution of the game upon determining that the user passed the challenge. The method also includes providing the user one or more rewards for passing the challenge, the rewards being associated with the game.

According to one embodiment of the present disclosure, a system is provided that includes means for storing instructions, and means for executing the stored instructions that, when executed by the means, cause the means to perform a method for granting access to a game. The method includes receiving a request to access the game from a user. The method also includes, in response to the request, causing to display a set of challenge options representing challenges of varying difficulty levels for a user to select. The method also includes receiving a selection of a challenge option from a user device associated with the user. The method also includes, in response to the selection, causing to present a challenge to the user. The method also includes receiving challenge data from the user including one or more of interactions with the challenge and results of the challenge. The method also includes determining whether the user passed the challenge based on the challenge data. The method also includes executing or enabling execution of the game upon determining that the user passed the challenge. The method also includes providing the user one or more rewards for passing the challenge, the rewards being associated with the game.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

In video games, a bot is a type of artificial intelligence (AI)—based expert system software that plays a video game in the place of a human. Bots are problematic because players who use them gain unfair advantages over other players. A CAPTCHA (an acronym for "Completely Automated Public Turing test to tell Computers and Humans Apart") is a type of challenge—response test used in computing to determine whether or not a user is human. CAPTCHAs may be utilized to prevent bots from accessing content intended only for human users. However, requiring users to pass CAPTCHAs each time they desire to play a game quickly becomes repetitive and cumbersome, which detracts from the gameplay experience.

Aspects of the present disclosure address these issues by providing for systems and methods wherein, instead of a single CAPTCHA, a user is presented with multiple dynamically-generated puzzles of increasing difficulty. Each puzzle may be each paired with an in-game reward. Any one of the puzzles may be solved to pass the CAPTCHA. Each puzzle may include scrambled parts of the in-game reward, for example, a weapon, a skin, in-game currency, etc., that the player will also receive upon successful completion. Players may choose the simplest option if they wish to get to the game faster, or they can take more time to get a larger reward. Users with more knowledge of the game may also be able to solve the difficult puzzles more quickly, which rewards high engagement players. Long term user behavior (i.e., always choosing the same/easiest option) also may provide additional information as to which users may be a bot. As a result, the CAPTCHA becomes part of the gameplay, and is no longer a barrier to the gameplay.

The disclosed system addresses a problem in traditional video game access tied to computer technology, namely, the technical problem of preventing bots from accessing video games. The disclosed system solves this technical problem by providing a solution also rooted in computer technology, namely, by providing for progressive CAPTCHAs that reward players for completing them. The disclosed subject technology further provides improvements to the functioning of the computer itself because it reduces processing and bandwidth costs associated with bots.

Figure 1:
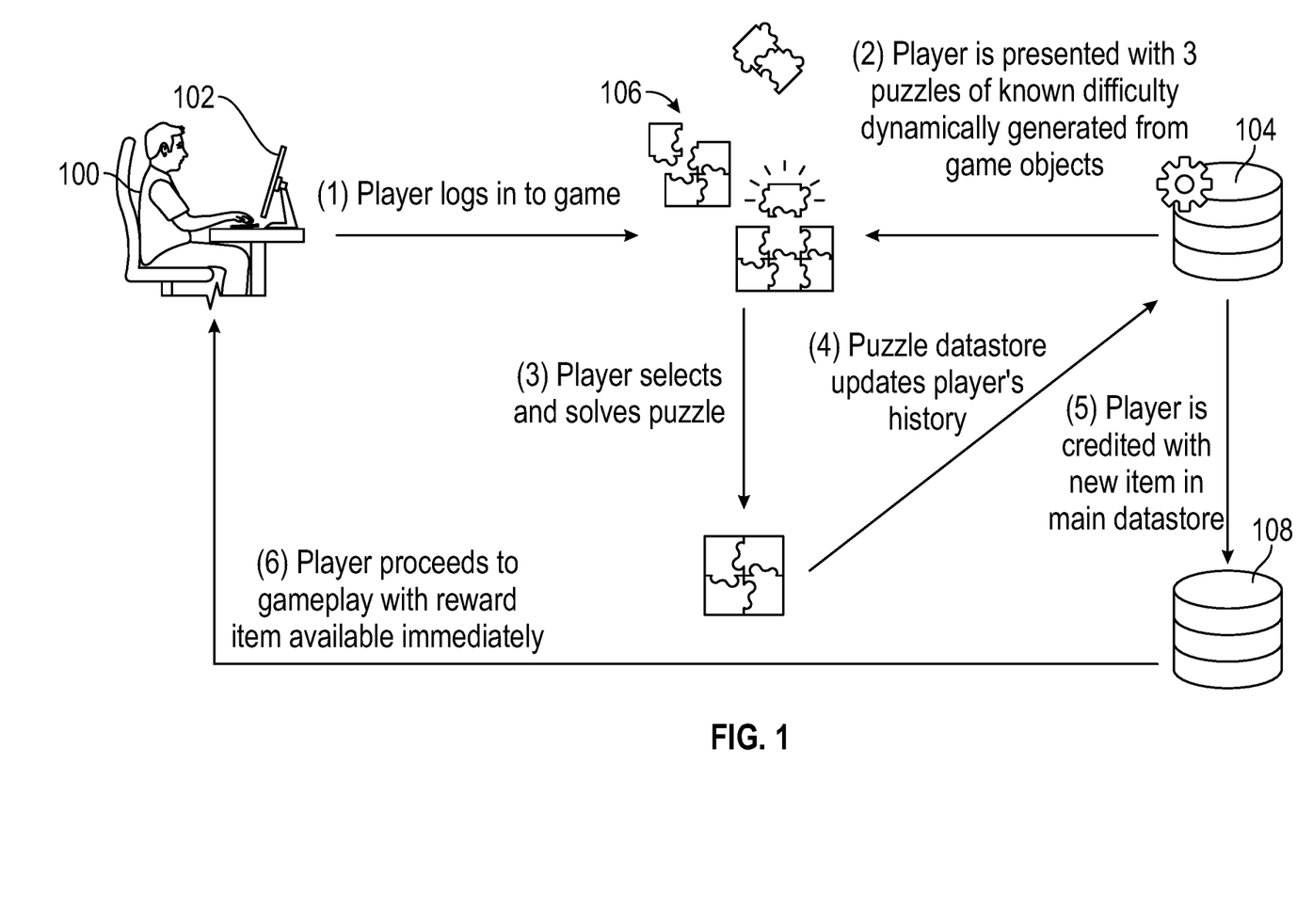
FIG. 1 illustrates an exemplary login process, according to certain aspects of the present disclosure.

FIG. 1 illustrates an exemplary login process, according to certain aspects of the present disclosure. According to aspects, a user 100 logs into a game via a user device (or "user computing device") 102. For example, the user device 102 may be a mobile device (e.g., a smartphone), a console, a set-top box, a desktop device (e.g., a laptop computer, a desktop computer, etc.), or the like. Upon receiving a request to log into the game, a puzzle datastore 104 may be configured to generate a set of puzzles 106 (e.g., a set of challenge options) of varying difficulty levels. For example, the set of puzzles 106 may include at least three CAPTCHA puzzles. The puzzles 106 may be generated from in-game objects, characters, in-game scenarios, etc. The puzzles 106 may have difficulty levels including easy, medium, and hard. Solving the puzzle 106 not only grants the user 100 access to the game, but also rewards the user with a reward. For example, the reward may include at least one of a small reward, a mid-value reward, or a high-value reward. Additionally, because the puzzles 106 are dynamically generated from a wide variety of game-specific elements, the puzzle datastore 104 will not run out of puzzles 106 to generate, and the puzzles 106 may each be unique.

The user 100 may then select a puzzle 106 to solve in order to access the game. Upon solving the puzzle 106, the puzzle datastore 104 may update a history of the user 100. The user 100 may then be credited with a new item in a main datastore 108 for solving the puzzle 106. The user 100 may then proceed with accessing the game, such that the reward is available immediately in the game.

According to aspects, the puzzle datastore 104 may utilize the history of the user 100 to keep track of a performance record of the user. The performance record may further be utilized to determine whether the user 100 is a human or a bot. For example, if the user 100 has a history of always choosing the easiest puzzle and consistently fails at the easiest puzzle, it is a strong indicator that the user 100 is a bot. Similarly, if the user 100 has a history that demonstrates a preference for selecting the hardest puzzle, and the user 100 consistently solves the hardest puzzle, it is a strong indicator that the user 100 is a human. It is understood that a variety of other user patterns may be indicative of whether the user is a human or a bot.

According to aspects, the main datastore 108 may store an inventory of items accessible by the player. The inventory of items in the main datastore 108 may be utilized to determine what types of rewards the user 100 may achieve. The main datastore 108 may also be utilized to keep track of the rewards earned by the user 100 through solving the puzzles 106.

According to aspects, the user 100 may fail at solving the puzzles 106 at times. The user 100 may be allowed to retry the puzzle 106, attempt a different puzzle of the same or different difficulty level, or the user 100 may be denied access after a failed attempt threshold has been reached.

Figure 2:
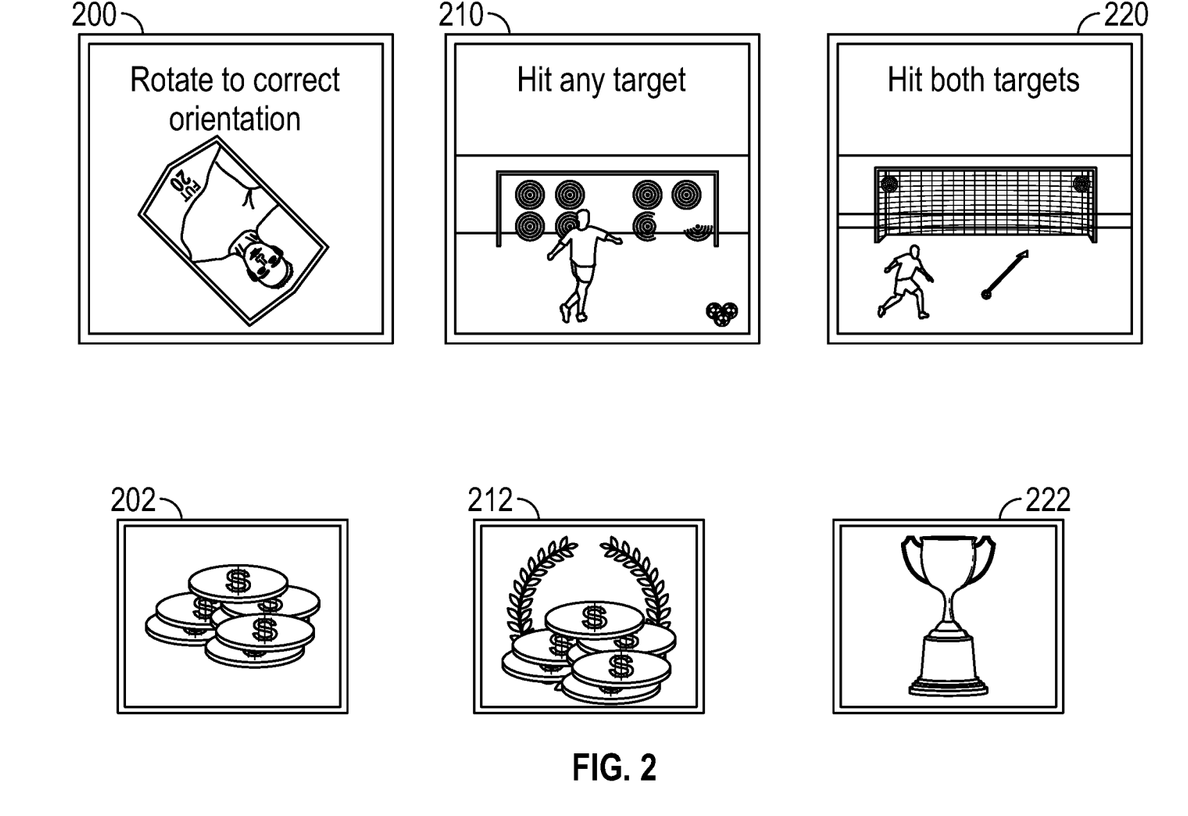
FIG. 2 illustrates exemplary challenges and rewards, according to certain aspects of the present disclosure.

FIG. 2 illustrates exemplary challenges and rewards, according to certain aspects of the present disclosure. As described above in FIG. 1, a variety of CAPTCHA puzzles (e.g., challenges) may be presented to a player to verify that the player is not a bot. According to aspects, a first puzzle 200 may be an easy puzzle with a small reward 202. For example, the first puzzle 200 may require the player to rotate a picture into an upright orientation. The picture may be related to the game, such as based on in-game characters, items, etc. The small reward 202 may include in-game currency, a low value skin, some points towards game progression, etc.

According to aspects, a second puzzle 210 may be a medium puzzle with a mid-value reward 212. For example, the second puzzle 210 may be for a soccer mini-game that requires the player to hit any target of a variety of targets. The mini-game may vary based on what type of game the player is attempting to access. For example, for a first-person shooter game, the player may be asked to shoot a target of a variety of targets. According to aspects, the mini-game may be based on in-game player mechanics, such that by completing the mini-game, the player also sharpens their in-game skillset. The mid-value reward 212 may include in-game currency (e.g., a higher amount than for the small reward 202), a mid-value skin, points toward game progression (e.g., a higher amount than for the small reward 202), etc.

According to aspects, a third puzzle 220 may be a hard puzzle with a high-value reward 222. For example, the third puzzle 220 may be for a soccer mini-game that requires the player to hit multiple targets. The targets may be located at corners of a goal, for example. Similarly, the mini-game may be generated based on the type of game the player is attempting to access (e.g., a shooting mini-game for a first-person shooter game). The high-value reward 222 may include rare items, rare skins, an unlocked achievement, a completed milestone, etc.

According to aspects, players may be allowed a set time period for solving the puzzles. For example, a first time period may be allowed for easy puzzles, a second time period may be allowed for medium puzzles, and a third time period may be allowed for hard puzzles, such that the first time period is longer than the second time period, and the second time period is longer than the third time period. As a result, players are given a longer period of time to solve easy puzzles as opposed to medium or hard puzzles. Similarly, players may be given a shorter period of time to solve the hard puzzles as opposed to the easy or medium puzzles.

It is understood that a variety of other challenges may be included without departing from the scope of the disclosure. For example, the challenges may be actual puzzles with pieces to be fit together to form an image.

As illustrated, the puzzles provide for human verification and also provide in-game incentives to players. As a result, the CAPTCHA verification process is game-specific to the player and becomes a part of the gameplay, rather than a barrier to the gameplay. Furthermore, players are incentivized to complete high difficulty CAPTCHAs, which improves on filtering out bots. Additionally, players that wish to access the game quickly may do so through low difficulty CAPTCHAs.

Figure 3:
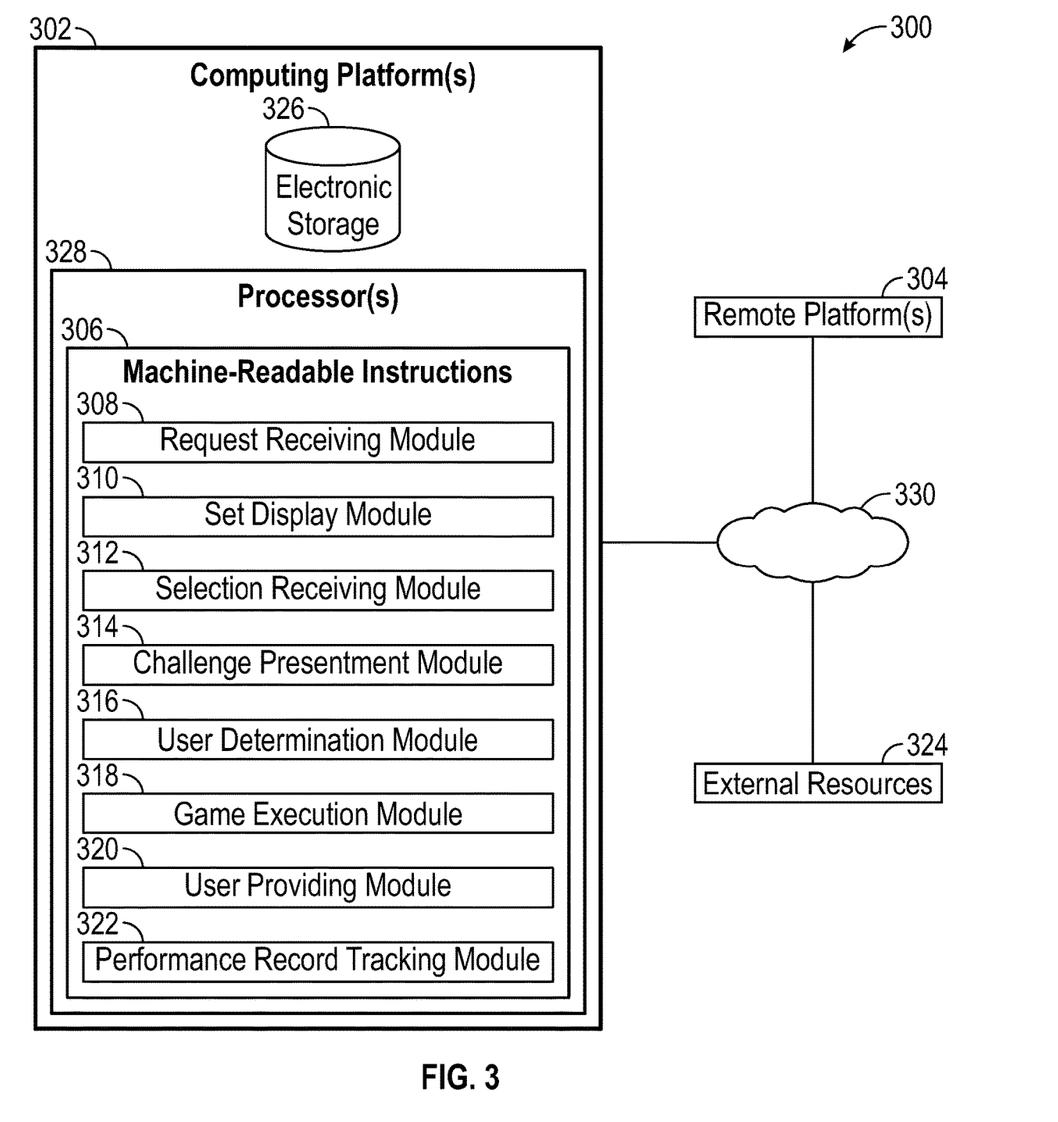
FIG. 3 illustrates a system configured for granting access to a game, in accordance with one or more implementations

FIG. 3 illustrates a system 300 configured for granting access to a game, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of request receiving module 308, set display module 310, selection receiving module 312, challenge presentment module 314, user determination module 316, game execution module 318, user providing module 320, performance record tracking module 322, and/or other instruction modules.

Request receiving module 308 may be configured to receive a request to access the game from a user. Set display module 310 may be configured to, in response to the request, display a set of challenge options including challenges of varying difficulty levels for a user to select. The set of challenge options may include at least three CAPTCHA challenges. By way of non-limiting example, the set of challenge options may include at least one of, a puzzle, an in-game skillset, or a mini-game. The set of challenge options may provide a minimum threshold for verifying that a user is a human as opposed to a bot. Each challenge of the set of challenge options may be based on an associated reward with that challenge.

Selection receiving module 312 may be configured to receive a selection of a challenge from the user. Challenge presentment module 314 may be configured to, in response to the selection, present the challenge to the user. User determination module 316 may be configured to determine whether the user passed the challenge.

User determination module 316 may be configured to determine whether the user is a human or a bot based on the performance record. Game execution module 318 may be configured to execute the game upon determining that the user passed the challenge.

User providing module 320 may be configured to provide the user a reward for passing the challenge. By way of non-limiting example, the reward may include at least one of, a skin, an item, in-game currency, or a rare item. By way of non-limiting example, the reward may be based on a difficulty level, and includes at least one of a small reward, a mid-value reward, and a high-value reward. The reward may be associated with the game.

Performance record tracking module 322 may be configured to track a performance record of the user. In some implementations, by way of non-limiting example, a difficulty level of a first challenge may be easy, a difficulty level of a second challenge is medium, and a difficulty level of a third challenge is hard.

In some implementations, computing platform(s) 302, remote platform(s) 304, and/or external resources 324 may be operatively linked via one or more electronic communication links. For example, such electronic communication links may be established, at least in part, via a network such as the Internet 330 and/or other networks. It will be appreciated that this is not intended to be limiting, and that the scope of this disclosure includes implementations in which computing platform(s) 302, remote platform(s) 304, and/or external resources 324 may be operatively linked via some other communication media.

A given remote platform 304 may include one or more processors configured to execute computer program modules. The computer program modules may be configured to enable an expert or user associated with the given remote platform 304 to interface with system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 324 may include sources of information outside of system 300, external entities participating with system 300, and/or other resources. In some implementations, some or all of the functionality attributed herein to external resources 324 may be provided by resources included in system 300.

Computing platform(s) 302 may include electronic storage 326, one or more processors 328, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 326 may comprise non-transitory storage media that electronically stores information. The electronic storage media of electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by processor(s) 328, information received from computing platform(s) 302, information received from remote platform(s) 304, and/or other information that enables computing platform(s) 302 to function as described herein.

Processor(s) 328 may be configured to provide information processing capabilities in computing platform(s) 302. As such, processor(s) 328 may include one or more of a digital processor, an analog processor, a digital circuit designed to process information, an analog circuit designed to process information, a state machine, and/or other mechanisms for electronically processing information. Although processor(s) 328 is shown in FIG. 3 as a single entity, this is for illustrative purposes only. In some implementations, processor(s) 328 may include a plurality of processing units. These processing units may be physically located within the same device, or processor(s) 328 may represent processing functionality of a plurality of devices operating in coordination. Processor(s) 328 may be configured to execute modules 308, 310, 312, 314, 316, 318, 320, and/or 322, and/or other modules. Processor(s) 328 may be configured to execute modules 308, 310, 312, 314, 316, 318, 320, and/or 322, and/or other modules by software; hardware; firmware; some combination of software, hardware, and/or firmware; and/or other mechanisms for configuring processing capabilities on processor(s) 328. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, and/or 322 are illustrated in FIG. 3 as being implemented within a single processing unit, in implementations in which processor(s) 328 includes multiple processing units, one or more of modules 308, 310, 312, 314, 316, 318, 320, and/or 322 may be implemented remotely from the other modules. The description of the functionality provided by the different modules 308, 310, 312, 314, 316, 318, 320, and/or 322 described below is for illustrative purposes, and is not intended to be limiting, as any of modules 308, 310, 312, 314, 316, 318, 320, and/or 322 may provide more or less functionality than is described. For example, one or more of modules 308, 310, 312, 314, 316, 318, 320, and/or 322 may be eliminated, and some or all of its functionality may be provided by other ones of modules 308, 310, 312, 314, 316, 318, 320, and/or 322. As another example, processor(s) 328 may be configured to execute one or more additional modules that may perform some or all of the functionality attributed below to one of modules 308, 310, 312, 314, 316, 318, 320, and/or 322.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
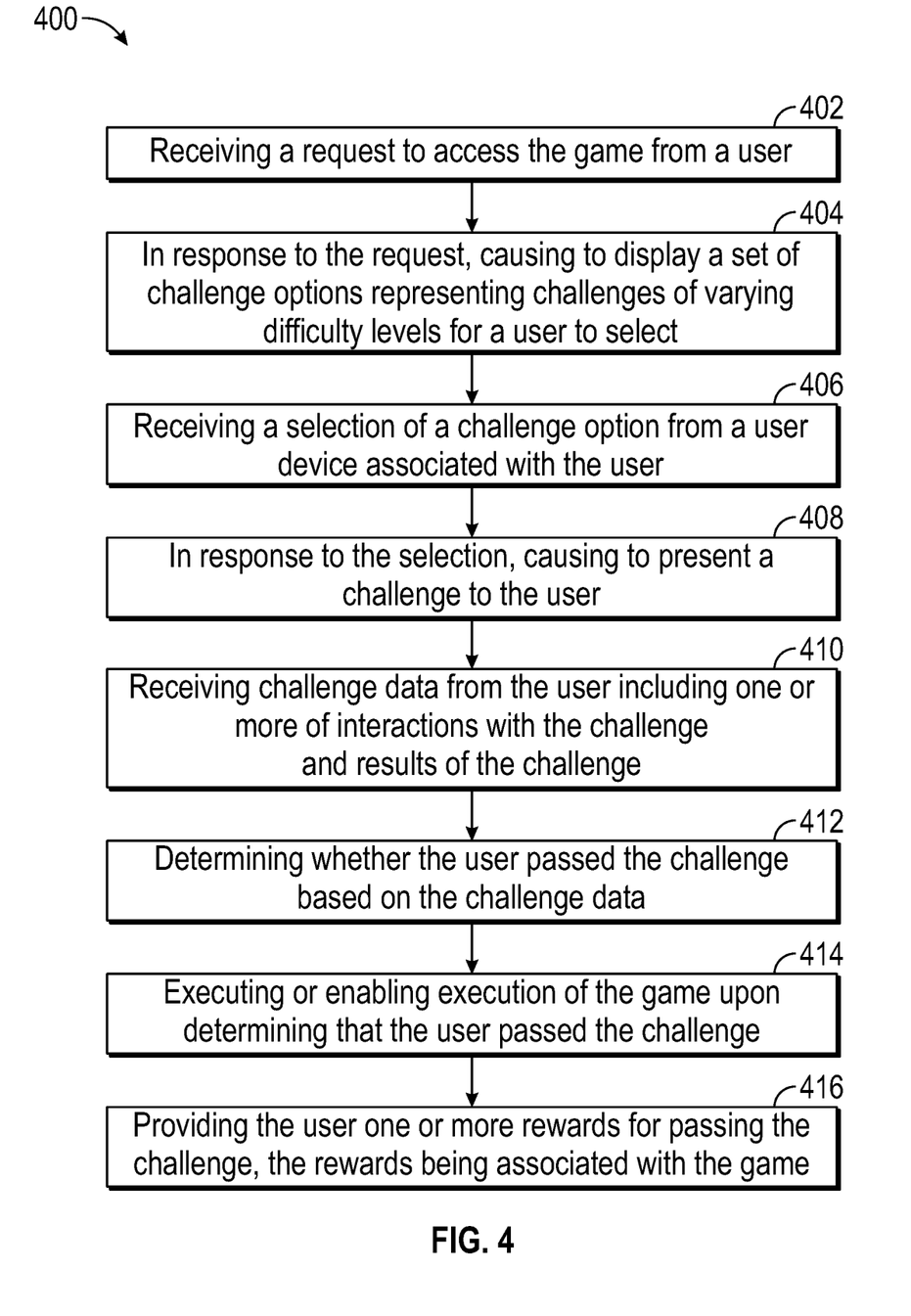
FIG. 4 illustrates an example flow diagram for granting access to a game, according to certain aspects of the disclosure.

FIG. 4 illustrates an example flow diagram (e.g., process 400) for granting access to a game, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, a request to access a game from a user is received. At step 404, in response to receiving the request, a set of challenge options is caused to be displayed that includes challenges of varying difficulty levels for a user to select. At step 406, a selection of a challenge option is received from a user device associated with the user. At step 408, in response to receiving the selection, the challenge is caused to be presented to the user. At step 410, receiving challenge data from the user including one or more of interactions with the challenge and results of the challenge. At step 412 it is determined whether the user passed the challenge based on the challenge data. At step 414, the game is executed or enabled to be executed upon determining that the user passed the challenge. At step 416, the user is provided one or more rewards for passing the challenge. The one or more rewards may be associated with the game.

For example, as described above in relation to FIGS. 1-3, at step 402, a request to access a game from a user 100 is received through the request receiving module 308. For example, the request may be sent from a user device 102. At step 404, in response to receiving the request, a set of puzzles 106 is caused to be displayed that includes puzzles of varying difficulty levels (e.g., as illustrated in FIG. 2) for the user 100 to select. At step 406, a selection of a puzzle 106 is received from the user 100 through the selection receiving module 312. At step 408, in response to receiving the selection, the puzzle 106 is caused to be presented to the user 100 through the challenge presentment module 314. At step 410, challenge data is received from the user including one or more of interactions with the challenge and results of the challenge. At step 412 it is determined whether the user 100 solved the puzzle 106 based on the challenge data. At step 414, the game is executed or enabled to be executed (e.g., through game execution module 318) upon determining that the user 100 solved the puzzle 106. At step 416, the user 100 is provided one or more rewards (e.g., as illustrated in FIG. 2) for solving the puzzle. The one or more rewards may be associated with the game and is available for immediate use.

According to an aspect, the reward may include at least one of, a skin, an item, in-game currency, or a rare item. According to an aspect, the set of challenge options may include at least three CAPTCHA challenges.

According to an aspect, the process 400 further includes tracking a performance record of the user, and determining whether the user is a human or a bot based on the performance record.

According to an aspect, a difficulty level of a first challenge is easy, a difficulty level of a second challenge is medium, and a difficulty level of a third challenge is hard. According to an aspect, the set of challenge options comprises at least one of, a puzzle, an in-game skillset, or a mini-game.

According to an aspect, the reward is based on a difficulty level, and comprises at least one of a small reward, a mid-value reward, and a high-value reward. According to an aspect, the set of challenge options provide a minimum threshold for verifying that a user is a human as opposed to a bot.

According to an aspect, each challenge of the set of challenge options may be based on an associated reward with that challenge. For example, if the reward is an in-game item, then the challenge may be based on a picture of the in-game item.

According to aspects, players may be allowed a set time period for solving the challenges. For example, a first time period may be allowed for easy challenges, a second time period may be allowed for medium challenges, and a third time period may be allowed for hard challenges, such that the first time period is longer than the second time period, and the second time period is longer than the third time period. As a result, players are given a longer period of time to solve easy challenges as opposed to medium or hard challenges. Similarly, players may be given a shorter period of time to solve the hard challenges as opposed to the easy or medium challenges.

Figure 5:
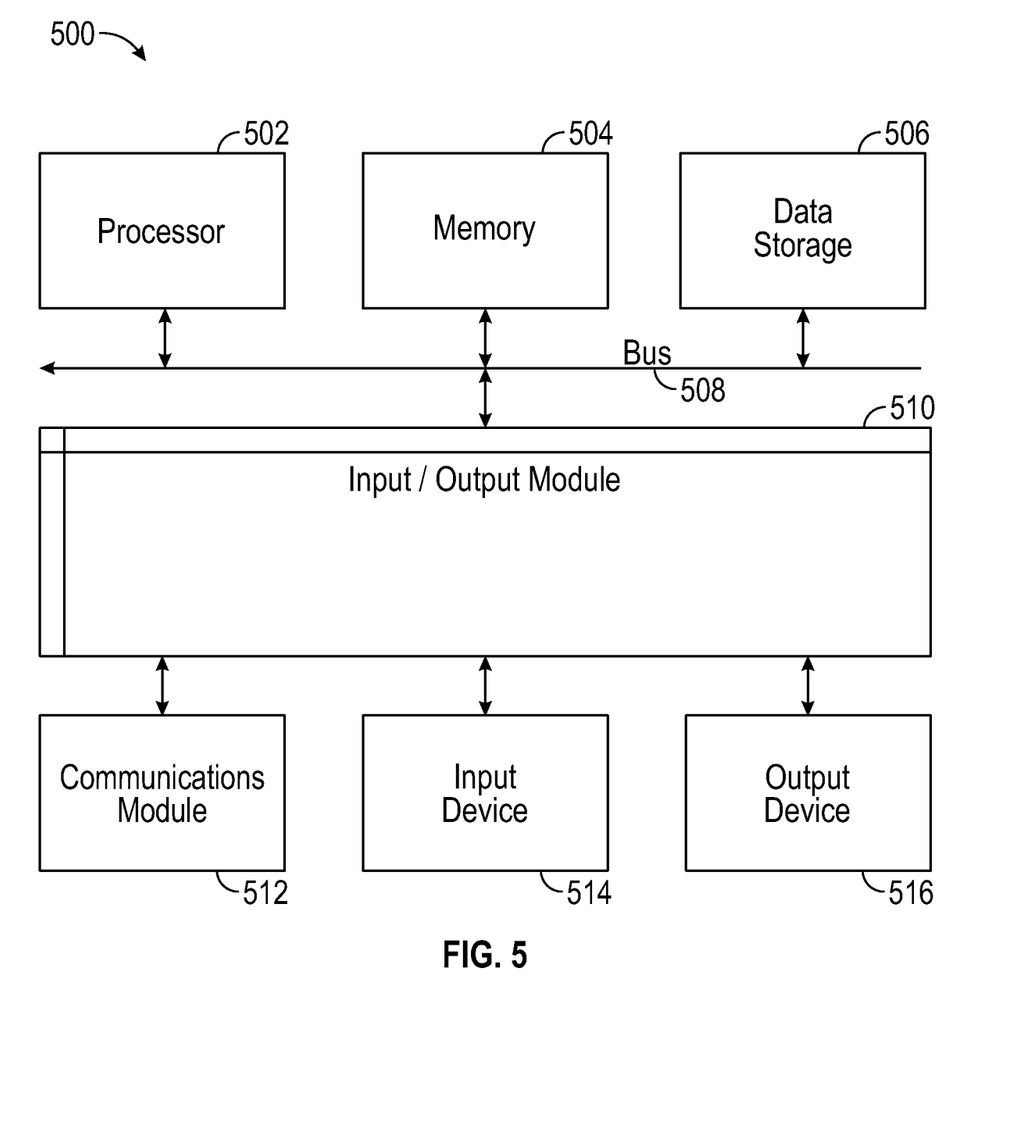
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as a LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for granting access to a game on a user device associated with a user, comprising:
   receiving a request to access the game on the user device, wherein the access enables execution of the game;
   in response to the request and prior to execution of the game, causing to display a set of selectable challenge options is of a varying difficulty level;
   receiving, from the user device, a selection of one of the challenge options;
   in response to the selection, causing to display a challenge corresponding to the selected challenge option, the challenge being generated from at least one or more in-game objects or in-game characters corresponding to the game;
   receiving, from the user device, challenge data corresponding to one or more interactions of the user with the challenge;
   determining whether the challenge is passed based on the challenge data;
   updating a history corresponding to the user based on the challenge data, the history providing a record of challenge options selected and challenges passed;
   granting access to the game based on the determining that the challenge is passed, wherein the granting access causes the game to be executed; and
   providing one or more rewards associated with the game, the one or more rewards being based on the challenge option selected and the challenge data.

2. The computer-implemented method of claim 1, wherein the reward comprises at least one of, a skin, an item, in-game currency, or a rare item.

3. The computer-implemented method of claim 1, further comprising:
   tracking a performance record of the user; and
   determining whether the user is a human or a bot based on the performance record.

4. The computer-implemented method of claim 1, wherein the set of challenge options comprises at least three CAPTCHA challenges.

5. The computer-implemented method of claim 1, wherein a difficulty level of a first challenge is easy, a difficulty level of a second challenge is medium, and a difficulty level of a third challenge is hard.

6. The computer-implemented method of claim 1, wherein the reward is based on a difficulty level, and comprises at least one of a small reward, a mid-value reward, and a high-value reward.

7. The computer-implemented method of claim 1, wherein the set of challenge options comprises at least one of a puzzle, an in-game skillset, or a mini-game.

8. The computer-implemented method of claim 1, wherein the set of challenge options provide a minimum threshold for verifying that a user is a human as opposed to a bot.

9. The computer-implemented method of claim 1, wherein each challenge of the set of challenge options is based on an associated reward with that challenge.

10. A system for granting access to a game on a user device associated with a user, comprising:
    a processor; and
    a memory comprising instructions stored thereon, which when executed by the processor, causes the processor to perform:
       receiving a request to access the game on the user device, wherein the access enables execution of the game;
       in response to the request and prior to execution of the game, causing to display a set of selectable challenge options is of a varying difficulty level;
       receiving, from the user device, a selection of one of the challenge options;
       in response to the selection, causing to display a challenge corresponding to the selected challenge option, the challenge being generated from at least one or more in-game objects or in-game characters corresponding to the game;
       receiving, from the user device, challenge data corresponding to one or more interactions of the user with the challenge;
       determining whether the challenge is passed based on the challenge data;
       updating a history corresponding to the user based on the challenge data, the history providing a record of challenge options selected and challenges passed;

granting access to the game based on the determining that the challenge is passed, wherein the granting access causes the game to be executed; and providing one or more rewards associated with the game, the one or more rewards being based on the challenge option selected and the challenge data.

11. The system of claim 10, wherein the reward comprises at least one of, a skin, an item, in-game currency, or a rare item.

12. The system of claim 10, further comprising stored sequences of instructions, which when executed by the processor, cause the processor to perform:

tracking a performance record of the user; and determining whether the user is a human or a bot based on the performance record.

13. The system of claim 10, wherein the set of challenges comprises at least three CAPTCHA challenges.

14. The system of claim 10, wherein a difficulty level of a first challenge is easy, a difficulty level of a second challenge is medium, and a difficulty level of a third challenge is hard.

15. The system of claim 10, wherein the reward is based on a difficulty level, and comprises at least one of a small reward, a mid-value reward, and a high-value reward.

16. The system of claim 10, wherein the set of challenge options comprises at least one of a puzzle, an in-game skillset, or a mini-game.

17. A non-transitory computer-readable storage medium comprising instructions stored thereon, which when executed by one or more processors, cause the one or more processors to perform operations for granting access to a game on a user device associated with a user, the operations comprising:

receiving a request to access the game on the user device, wherein the access enables execution of the game;

in response to the request and prior to execution of the game, causing to display a set of selectable challenge options is of a varying difficulty level;

receiving, from the user device, a selection of one of the challenge options;

in response to the selection, causing to display a challenge corresponding to the selected challenge option, the challenge being generated from at least one or more in-game objects or in-game characters corresponding to the game;

receiving, from the user device, challenge data corresponding to one or more interactions of the user with the challenge;

determining whether the challenge is passed based on the challenge data;

updating a history corresponding to the user based on the challenge data, the history providing a record of challenge options selected and challenges passed;

granting access to the game based on the determining that the challenge is passed, wherein the granting access causes the game to be executed; and providing one or more rewards associated with the game, the one or more rewards being based on the challenge option selected and the challenge data.

18. The non-transitory computer-readable storage medium of claim 17, comprising further instructions which, when executed by the one or more processors, cause the one or more processors to perform operations, wherein the reward comprises at least one of, a skin, an item, in-game currency, or a rare item.

19. The non-transitory computer-readable storage medium of claim 17, comprising further instructions which, when executed by the one or more processors, cause the one or more processors to perform operations comprising:

tracking a performance record of the user; and determining whether the user is a human or a bot based on the performance record.

20. The non-transitory computer-readable storage medium of claim 17, comprising further instructions which, when executed by the one or more processors, cause the one or more processors to perform operations, wherein the set of challenge options comprises at least three CAPTCHA challenges.

* * * * *